UNITED STATES PATENT OFFICE.

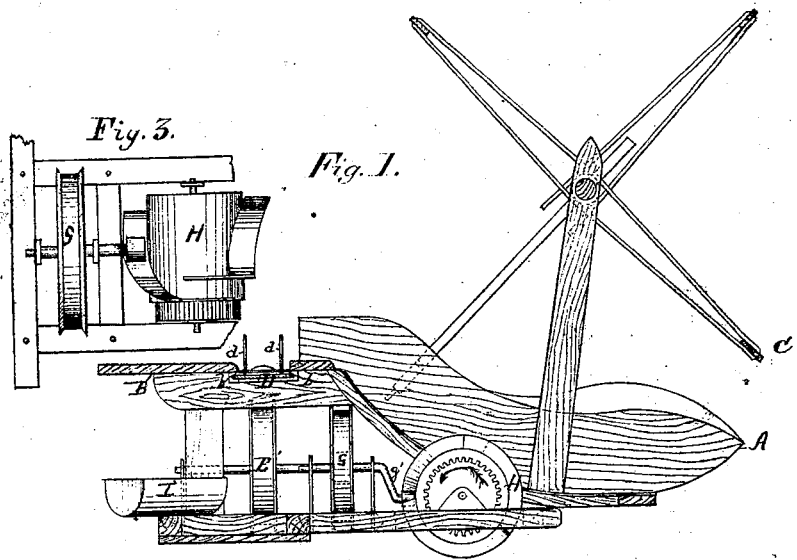
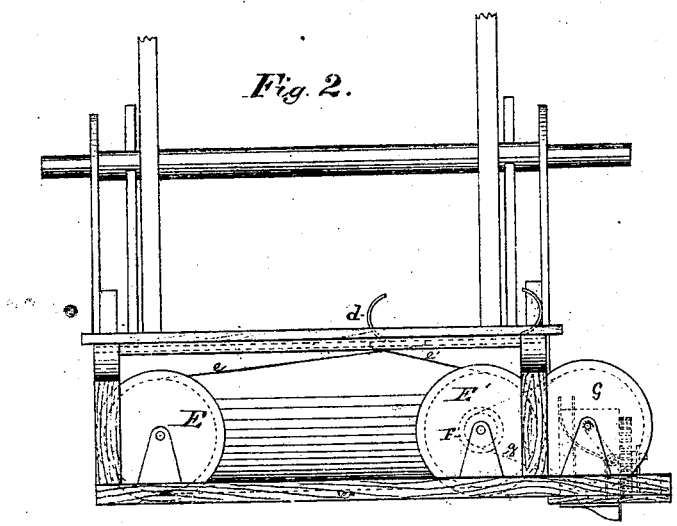

WARREN SUTLIFF, OF BURNS, WISCONSIN.

IMPROVEMENT IN HARVESTER-RAKES.

Specification forming part of Letters Patent No. 109,469, dated November 22, 1870.

*To all whom it may concern:*

Be it known that I, WARREN SUTLIFF, of Burns, in the county of La Crosse and State of Wisconsin, have invented a new and useful Improvement in Harvesters; and I do hereby declare that the following is a full and exact description of the same, reference being had to the accompanying drawing, and to the letters of reference marked thereon.

This invention consists in the construction and arrangement of certain devices for gathering the grain into suitable bundles to be bound, it being cut by the knives of the reaper and delivered by a rake on the reel to the binding-table, the details of which construction will be fully described hereinafter.

In the drawing, Figure 1 represents a side elevation of my improvement in harvesters; Fig. 2, an end elevation of the same; and Fig. 3 represents a plan view of the cam-wheel H and its immediate connections.

To enable others skilled in the art to make and use my invention, I will now proceed to describe fully its construction and manner of operation.

A represents the receiving-platform, upon which the grain falls as it is cut by the knives. This platform extends upward rearwardly in the arc of a circle, and unites with the binding-table B, as shown. C represents the reel, of usual construction, except that its cross-bars uniting the arms are provided with teeth, which move over the curving platform A as the reel revolves, and carry the grain to the table C. The table B is provided with slots $b\ b$, through which project the curving arms or teeth $d\ d$, which are rigidly attached to the slide D, moving in ways beneath, and also represent arms or teeth rigidly attached to one end of the table B, as shown.

The slide D is operated as follows: E E' represent pulleys located beneath the table, which are provided with suitable shafts resting in proper bearings. $e\ e^1$ represent cords, one end of each of which is securely attached to one of the pulleys, and the other end to the slide, as shown. The pulleys themselves are connected also by means of a cord, $e^2$. Upon the end of the shaft of pulley E' a smaller pulley, F, is located, which is connected to the larger pulley G by means of a cord, $g$, which is wound once about pulley F, and secured at each end to pulley G. The shaft of pulley G, at its forward end, terminates in a crank, $g'$, which is provided with a friction-roller, as shown.

H represents a cylinder, provided with flanges suitably arranged, by means of which a reciprocating motion is given to the crank $g'$ when the cylinder is revolved. The cylinder, however, has a continuous rotary motion, being driven by means of gearing engaging with the cogs of the main driving-wheel.

The operation is as follows: The cylinder H receives from the main driving-wheel a continuous rotary motion in the direction indicated by the arrow. From the peculiar arrangement of the flanges it will be observed that the crank $g'$ is first moved about a quarter-revolution in one direction, and then forced back to its former position. By means of this movement the pulley G is similarly actuated, and, through the various cords described, the pulleys F and E E' also. The movement of these latter pulleys causes the slide D to move forward and back across the binding-table. The movement of the slide takes place in proper harmony with that of the reel, so that, as the grain is delivered by the latter to the table, the slide is in the proper position to receive it.

The movements are as follows: As the grain is cut it is carried upon the platform by the teeth of the reel at regular intervals, and delivered upon the binding-table B in position across the slots. As soon as the rake has left the grain, the slide D moves forward, and carries it along the table B to where the binder stands on the platform, on the right side of the machine.

The trough I at the binder's left hand contains straw for bands, one of which should be made and placed in readiness to receive the bundle before the movement of the slide, the table being provided with a socket or receptacle for the end of the band, in order that the grain may easily pass over it.

The bundle, being gathered by the machine, is bound by the binder and thrown upon the ground. The grain, being gathered in bundles, and being delivered conveniently to the binder, is easily bound by a single person.

Having thus fully described my invention, what I claim as new, and desire to secure by Letters Patent, is—

The cylinder H, constructed as described, in combination with the shaft $g'$, pulleys G $g$ E' E and their connections, and slide D, the parts being arranged as described, for the purpose set forth.

This specification signed and witnessed this 15th day of August, 1870.

WARREN SUTLIFF.

Witnesses:
   L. A. VIETS,
   J. U. VIETS.